United States Patent
Katsuyama

[15] 3,644,025
[45] Feb. 22, 1972

[54] DEVICE FOR CONTROLLING ANGLE OF OPENING OF SHUTTER FOR MOVIE CAMERA

[72] Inventor: Yoshihisa Katsuyama, Kawasaki, Japan
[73] Assignee: Nippon Kogaku K.K., Tokyo, Japan
[22] Filed: Mar. 2, 1970
[21] Appl. No.: 15,430

[30] Foreign Application Priority Data

Mar. 27, 1969 Japan..................................44/26696

[52] U.S. Cl..............................................352/217, 352/91
[51] Int. Cl.......................................................G03b 21/36
[58] Field of Search..........................................352/217, 91

[56] References Cited

UNITED STATES PATENTS

| | | | |
|---|---|---|---|
| 2,065,777 | 12/1936 | Weissbrodt | 352/217 |
| 2,376,301 | 5/1945 | Widmer | 352/217 |
| 3,531,194 | 9/1970 | Roppel et al. | 352/217 X |

Primary Examiner—Donald O. Woodiel
Attorney—Ward, McElhannon, Brooks & Fitzpatrick

[57] ABSTRACT

A device for controlling a variable shutter in a motor driven movie camera having a multibladed adjustable shutter in which relative movement between the shutter blades varies the opening angle of the shutter aperture. A driving train is provided for relatively moving the shutter blades which includes a cam connected to the shutter blades so that one revolution of the cam opens or closes the shutter aperture, a driven gear carried by the cam, clutch means, manually operable means for actuating the clutch means including a manually controlled lever movable between a first position in which a driven gear is disconnected from a driving gear and a second position in which the control lever actuates the clutch means to interconnect the driving gear with the driven gear. A detent pawl is engageable with the teeth of the driven gear for arresting variation of the shutter aperture, said detent pawl being movable in cooperation with the control lever to disengage it from the driven gear when the control lever is positioned in its second position.

4 Claims, 2 Drawing Figures

PATENTED FEB 22 1972  3,644,025

DEVICE FOR CONTROLLING ANGLE OF OPENING OF SHUTTER FOR MOVIE CAMERA

BACKGROUND OF THE INVENTION

The present invention relates to a device for controlling the angle of opening of a multiple bladed shutter for movie cameras.

According to the conventional art, in the device for controlling angle of opening of a multiple-bladed shutter in which relative movement of the blades varies the angle of opening of the shutter, when actuating said device in normal or opposite direction in an automatic drive, it was required that another device for switching the relative movement of shutter blades in normal or opposite direction and a locking device for maintaining the shutter in the predetermined opening angle while the shutter is released from the automatic drive mechanism in addition to the device for interlocking and releasing the automatic drive mechanism. Therefore the device is complicated in construction and operation especially when the fade-in and fadeout photography are continuously repeated, which is accounted to be a drawback.

An object of the present invention is to provide a powered fading device simple in construction which includes an automatic drive mechanism in addition to the device for controlling angle opening of shutter for movie camera and operates in such that said mechanism be able to interlock or release with said device.

Another object of the present invention is to provide a construction wherein the member for operating the automatic drive mechanism and the member for holding the angle of opening of shutter at a predetermined angle is so arranged that when automatic drive mechanism of the powered fading device is in operation said mechanism will not be interfered by said opening holding member in the device for controlling the angle of opening of shutter.

SUMMARY OF THE INVENTION

In brief, according to the present invention a device for controlling the angle of opening of shutter which can continuously open and close the opening of shutter with a predetermined cycle and which can hold the opening at a predetermined degree for normal photography may be operatively and releasably coupled with shutter driving means by the operation of interlocking clutch operating member and when both of said device and said shutter driving means are operatively coupled with each other, said device for controlling the angle of opening may be released from holding the angle of opening at a predetermined angle by said operating member.

The above and other objects, features and advantages of the present invention will become more apparent from the following description of one illustrative embodiment thereof taken in conjunction with the accompanying drawing.

DESCRIPTION OF THE PREFERRED EMBODIMENT

Figure 1:
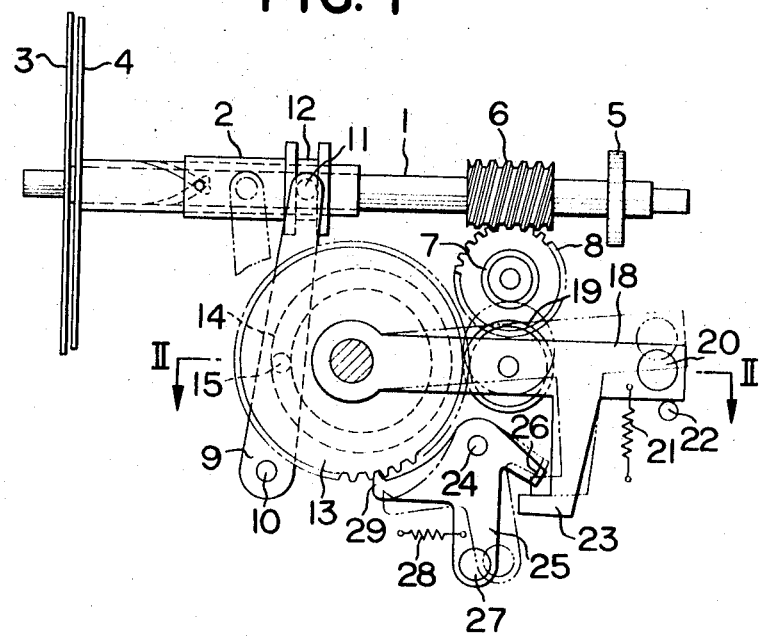
FIG. 1 is an elevation of one embodiment of the present invention.
Figure 2:
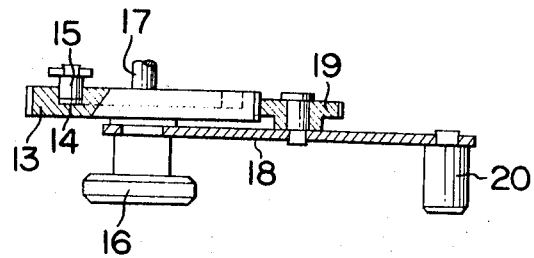
FIG. 2 is a sectional view taken along the line II—II of FIG. 1.

Referring to FIG. 1, a rotary shutter has, which is a well-known construction, a rotary shaft 1 and a sleeve 2 slidable to the left so that shutter blades 3 and 4 are rotated relative to each other, whereby the angle of opening of the shutter blades can be controlled. The shaft 1 is rotated through a gear 5 by a motor (not shown) in cooperation with mechanisms for driving the film (not shown). A worm gear 6 carried by the shaft 1 is in mesh with a worm wheel 8 made integral with a pinion 7. A pin 11 extending from one end of the lever 9 which is pivoted to a fixed or stationary shaft 10 is fitted into a groove 12 of the sleeve 2. Another pin 15 extending from the center of the lever 9 is fitted into a groove 14 formed in gear 13 which will be described in more detail hereinafter.

The gear 13 which is made integral with a knob 16 is rotatably pivoted by a shaft 17 and is in mesh with an idle gear 19 carried by a clutch lever 18 which in turn is rotatably carried by the shaft 17. The groove 14 in the form of a loop is formed on the gear 13, and related to the predetermined angular displacement of said gear the lever 9 is rotated in the counterclockwise direction through pin 15 so as to slide the sleeve 2 to the predetermined position through pin 11.

Thus, the above-described sleeve 2, the lever 9, the fixed or stationary shaft 10, the pin 11, the groove 12, the gear 13, the groove 14, the pin 15, the knob 16, and the shaft 17 constitute a device for controlling an angle of opening of shutter. The clutch lever 18 has a key-shaped member 23 which is adapted to engage with a bent arm portion 26 of a lock lever 25 which will be described later. A knob 20 is fixed to one end of the clutch lever 18. The clutch lever 18 is so biased by a tension spring 21 that the clutch lever 18 may be held in such position at which the idle ear 9 is held out of mesh with the pinion 7, but the idle gear 19 can be in mesh with the pinion 7 when the clutch lever 18 is rotated in the counterclockwise direction against the tension spring 21.

A knob 27 is fixed to one end of the lock lever 25 which has the above-described bent arm 26 and a pawl 29 and which is biased by a tension spring 28 so as to rotate in the clockwise direction. Therefore, the pawl 29 is in mesh with the gear 13 so that the latter is not permitted to rotate. However, when the lock lever 25 is displaced to the predetermined position in the counterclockwise direction, the pawl 29 is out of mesh with the gear 13. It is noted that when the clutch lever 18 is rotated in the counterclockwise direction, the bent arm 26 engages with the key-shaped member 23 so that the pawl 29 is made out of mesh from the gear 13 immediately before the idle gear 19 engages with the pinion 7.

Next the mode of operation will be described hereinafter. When the angle of opening of shutter is desired, the lock lever 25 is rotated through the knob 27 in the counterclockwise direction while knob 16 is manually rotated to a predetermined position and held in this position because of the action of the tension spring 28. When the knob 20 is raised, he clutch lever 18 is caused to rotate in the counterclockwise direction so that its key-shaped member 23 engages with the arm 26, whereby the lock lever 25 is caused to rotate. Thus, after the gear 13 has become free to rotate, the idle gear 19 engages with the pinion 7 so that the idle gear 19 is derived through the worm 6, the worm wheel 8 and the pinion 7 following the rotation of the shaft 1 by the motor (not shown), whereby the gear 13 is rotated, thereby the sleeve 2 is slided in automatic drive through the lever 9.

Since the groove 14 is looped, when said automatic drive is carried on the sleeve 2 is caused to make a reciprocal movement with a predetermined cycle so that the operation of making the opening of the shutter fully opened and then completely closed may be cycled. Thus, the fade-in and fadeout can be automatically effected in combination with the control of the angle of opening by means of the manual operation of the knob 16, independently of the direction of rotation of the shaft 1.

It is noted that the lock lever 25 is provided for preventing positively the deviation of a predetermined angle of opening for normal photography and functions in the similar manner as the well-known click stop device and locking device utilizing the frictional force.

According to the present invention, the operation of varying the angle of opening of shutter may be carried automatically irrespective of the direction of the advance of the film, but in response to the amount of film advancement.

Furthermore, the device for varying the angle of opening of shutter will not interfere in operation with the member for holding the shutter at a predetermined angle of opening so that no excess load is exerted upon the motor when the angle of opening is automatically varied. Thus, the high overall efficiency is ensured and overall mechanism is constructed in compact and simple form which requires smaller space, therefore it has a great advantage in practice.

The present invention has been so far described with particular reference to one illustrative embodiment thereof, but it will be understood that variations and modifications can be effected without departing from the true spirit of the present invention as described hereinabove and as defined in the appended claims.

What is claimed is:

1. A device for controlling a variable shutter in a motor-driven movie camera comprising a multibladed adjustable shutter in which relative movement between the shutter blades varies the opening angle of the shutter aperture;

driving shaft adapted to rotate said shutter and having a driving gear;

a driving train for relatively moving the shutter blades including a cam connected to the shutter blades, one revolution of said cam closing and opening the shutter aperture;

a driven gear carrying said cam and rotatable therewith;

clutch means interconnecting said driving gear and said driven gear to transmit the rotation of said driving gear to said driven gear;

manually operable means for actuating said clutch means including a manually controlled lever movable between a first position in which said driven gear is disconnected from said driving gear and a second position in which said control lever actuates said clutch means to interconnect said driving gear with said driven gear;

and a detent pawl engageable with the teeth of said driven gear for arresting variation of the shutter aperture, said detent pawl being movable in cooperation with said control lever to disengage it from said driven gear when said control lever is positioned in its second position.

2. A device according to claim 1 further comprising a first spring for biasing said control lever to its first position and a second spring for biasing said detent pawl to said driven gear, and wherein said control lever and said detent pawl have respective extending arms connected to each other, whereby said control lever is moved by hand to its second position against said first and second springs.

3. A device according to claim 2, wherein said detent pawl has a first knob for disengaging said detent pawl from said driven gear against said second spring when said control lever is in said first position, and said driven gear has a second knob rotatable therewith for optionally adjusting said shutter aperture when said first knob moves against said second spring.

4. A device according to claim 2, wherein said control lever is mounted coaxially with respect to said driven gear, and wherein said clutch means includes an idle gear provided on said control lever and normally meshed with said driven gear, thereby said idle gear is connected to said driving gear when said control lever is located in its second position.

* * * * *